United States Patent [19]

Leshem

[11] 4,018,344
[45] Apr. 19, 1977

[54] THREE-POSITION ACTUATOR AND APPARATUS INCORPORATING SAME

[75] Inventor: Adam Leshem, West Hartford, Conn.

[73] Assignee: Combustion Engineering, Inc., Windsor, Conn.

[22] Filed: Nov. 18, 1975

[21] Appl. No.: 633,063

[52] U.S. Cl. .............................. 214/1 BB; 165/76; 214/1 CM
[51] Int. Cl.² ........................................ F28G 15/08
[58] Field of Search ......... 165/76; 214/1 BB, 1 CM

[56] References Cited

UNITED STATES PATENTS

| 3,811,320 | 5/1974 | Cowell | 214/1 CM X |
| 3,889,820 | 6/1975 | Ranger | 214/1 BB |

*Primary Examiner*—Robert J. Spar
*Assistant Examiner*—George F. Abraham
*Attorney, Agent, or Firm*—Stephen L. Borst; Eldon H. Luther

[57] ABSTRACT

An actuator comprises a piston and cylinder in which the piston is biased axially inwardly of the end of the cylinder to an intermediate position by two bias members respectively on axially opposite sides of the piston. Limit means associated with each respective bias member serve to coact between the respective bias member and the cylinder to limit the inward travel of the respective bias member in the cylinder to establish a constant position at which the piston receives no net biasing force from the two bias members. Each limit means may comprise a flanged cup which moves with the inner end of the bias member and a stop surface in the cylinder for engaging the cup flange to limit its inward movement, and thus the inward movement of the bias member.

In one application the actuator forms part of a surface traversing apparatus, with the cylinder being fixed to a base portion of the apparatus and the piston serving to selectively position anchor fingers connected thereto to each of three precise positions relative to the cylinder in response to fluid pressure on the piston.

12 Claims, 10 Drawing Figures

THREE-POSITION ACTUATOR AND APPARATUS INCORPORATING SAME

BRIEF SUMMARY OF THE INVENTION

The invention relates generally to actuators and more particularly to new and improved actuators actuable to at least three positions. More particularly still, the invention relates to new and improved actuators suitable for stepping a surface traversing apparatus.

U.S. Pat. No. 3,913,752 issued Oct. 21, 1975 to Ward et al for "Remotely Movable Platform" described a remotely operable self-propelled carriage or platform suited for traversing the surface of a member, as for instance the tube sheet in a nuclear steam generator. Two groups of anchor fingers, connected to and forming part of the platform, are selectively engageable with and disengageable from the member and are laterally movable relative to one another on respective slider arms for stepping or "walking" the platform across the member. Accuracy in the stepping of the fingers is essential where the anchor fingers are to be aligned for insertion into holes in the tube sheet. A piston and cylinder-type actuator which includes both a conventional piston and a hollow intermediate piston within the cylinder is used in the aforementioned patent to reciprocate each slider arm mounting the anchor fingers to each of three discrete positions. Close control of relative fluid pressures in the cylinder is required to move the slider, and thus the finger, to each position with repeated accuracy.

It is a principal object of the invention to provide a new and improved actuator which is actuable to each of three positions with highly repeatable accuracy. Included in this object is the provision of a new and improved actuator which normally assumes one precise position and is energizable to either of two other precise positions. Further included in this object is the provision of a new and improved actuator requiring minimal control of the energizing forces applied thereto.

It is another object of the invention to provide a new and improved piston and cylinder-type actuator in which the piston normally assumes one precise position and is displaceable to either of two other positions with highly repeatable accuracy and requires a minimal number of fluid pressure sources for actuation.

It is still another object of the invention to provide a piston and cylinder-type actuator which is self-centering when the fluid driving forces are removed therefrom.

It is still another object of the invention to provide a new and improved surface traversing apparatus having anchors movable laterally of one another for alignment with various respective openings in a member including a new and improved stepping actuator for stepping one or more of the anchors from alignment with one opening to alignment with another opening with a high degree of repeatable accuracy. Included in this object is the provision of a piston and cylinder-type actuator in which the piston normally assumes a precise intermediate position and is displaceable precisely to each of two opposite extreme positions. Further included in this object is the provision of a piston and cylinder-type actuator requiring a minimum number of different fluid pressures for actuation.

According to the invention, there is provided a new and improved actuator including a drive member which is reciprocable between a centered or intermediate position and each of two opposite extreme positions, and a pair of bias means acting longitudinally in opposition to one another on the drive member to move the drive member toward the intermediate position. A pair of dog means respectively engage the pair of bias means near their longitudinally inner ends for respective movement therewith. Two stop surfaces are positioned to respectively engage the dog means to limit the longitudinally inward movement of the respective bias means. The longitudinal spacing between the two stop surfaces is established such that the net biasing force applied by the pair of means to the drive member is terminated for only one substantially constant precise neutral longitudinal positioning thereof.

In a preferred embodiment, the actuator comprises a double acting piston and cylinder in which a pair of opposed bias springs respectively urge the piston axially inwardly of the cylinder, the inward displacement of the respective bias spring being limited by respective stop surfaces spaced in the cylinder such that the piston normally rests at a single precise position. The piston and cylinder comprise a stepping actuator connected to step one anchor of a surface traversing platform laterally relative to another anchor for accurately stepping the platform across the surface of a member.

Other objects will be in part obvious and in part pointed out more in detail hereinafter.

A better understanding of the invention will be obtained from the following detailed description and the accompanying drawings of an illustrative application of the invention.

DESCRIPTION OF THE PREFERRED EMBODIMENT

Figure 1:
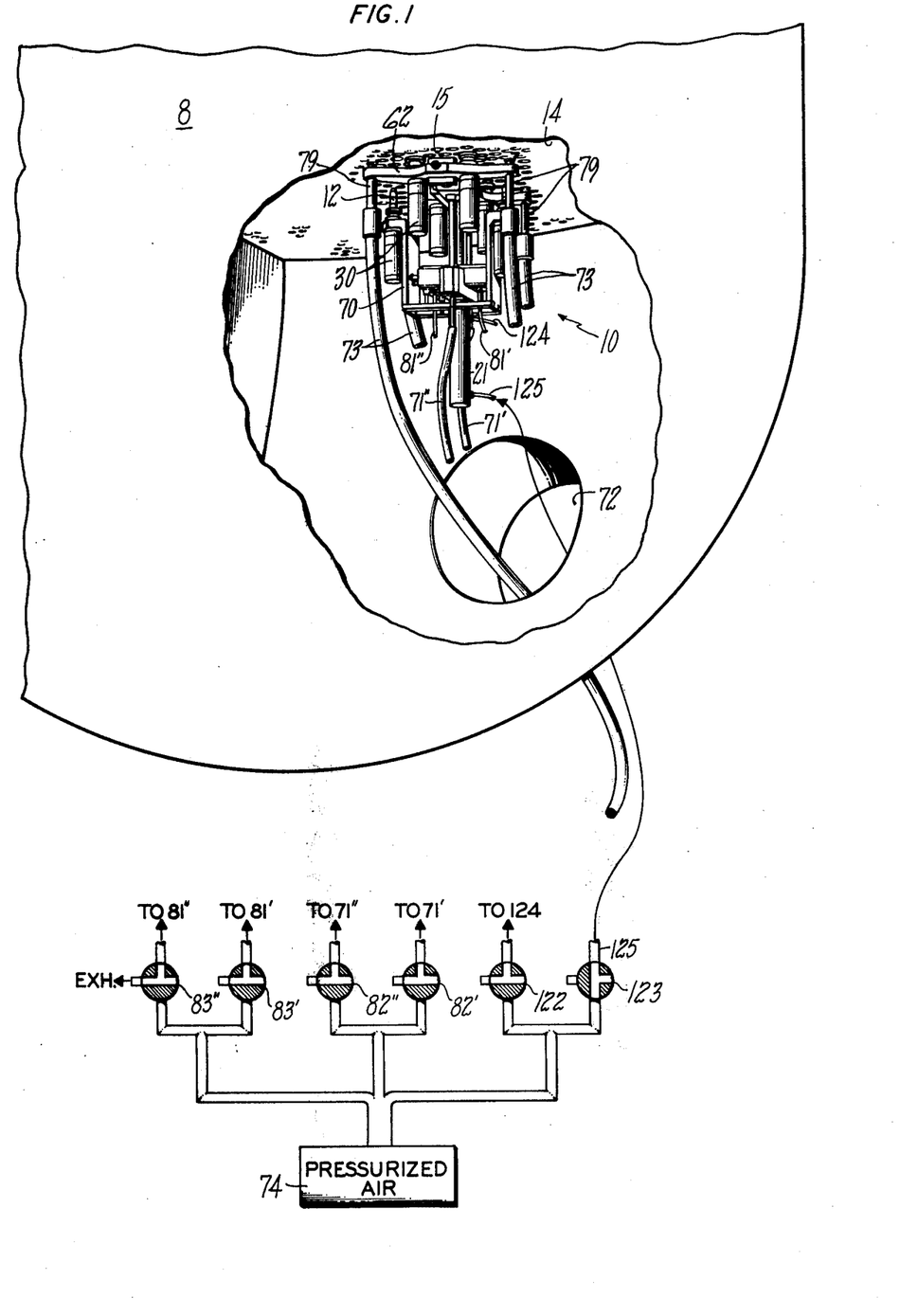
FIG. 1 is a perspective view of a surface traversing apparatus incorporating the improvements of the invention operatively positioned in a nuclear steam generator.

Referring to the drawings, there is depicted an improved surface traversing apparatus or platform 10 in accordance with the invention. The platform 10 is depicted in FIG. 1 in operative positioning closely beneath the half of a horizontally extending tube sheet 14 located in one side of a nuclear steam generator 8.

Briefly, platform 10 is comprised of a pair of interconnected slide assemblies 18 and 19, seen in FIGS. 3-7, which respectively mount four expandable fingers 11 and four expandable fingers 12. The fingers 11 and 12 are mounted for limited deflection relative to the slide assemblies 18 and 19 and are vertically oriented and sized for insertion into and withdrawal from circular openings 15 in the tube sheet 14, the openings 15 being defined by tubes 16 which extend downwardly through the tube sheet 14 and which are joined at their lower ends to the tube sheet, as by substantially circular weld beads 17 (seen in FIGS. 8A-C). Each finger 11, 12 is selectively expandable by a respective actuating cylinder 30 for gripping engagement with a respective tube 16 when inserted therewithin, the cylinders 30 for fingers 11 being interconnected for common actuation and the cylinders 30 for fingers 12 being interconnected independently of the finger 11 cylinders for common actuation.

The slide assemblies 18 and 19 are variably spaceable relative to one another in the vertical direction and are interconnected by a linear actuator, such as the vertically oriented double acting cylinder 21 and piston 20, for controllably varying the vertical spacing therebetween and accordingly varying the relative longitudinal or vertical positioning between fingers 11 en bloc and fingers 12 en bloc to selectively alternatively insert all of the fingers 11, 12 or only fingers 11, or only fingers 12 into respective openings 15.

The slide assemblies 18 and 19 comprise respective bases 22 and 23 and respective three-position self-centering actuators which comprise motors such as the slide cylinder assemblies 24 and 25 housed in bases 22 and 23 respectively. The fingers 11 and 12 and their respective actuating cylinders 30 are indirectly mounted by the slide cylinder assemblies 24 and 25 respectively. The slide cylinder assemblies 24 and 25 generally comprise cylinders 26 and 27 respectively housed in bores 42 and 43 in the bases 22 and 23 respectively, and pistons 28 and 29 operable in the cylinders 26 and 27 respectively. The cylinders 26 and 27 extend horizontally in orthogonal relationship to one another, and the fingers 11 and 12 are mounted for movement en bloc with the pistons 28 and 29 respectively to provide relative movement between fingers 11 and 12 laterally or transversely of their longitudinal extents in response to selective actuation of cylinder 26 or 27 for stepping the platform 10. The slide cylinder assemblies 24 and 25 are structured such that the respective pistons 28 and 29 each normally assume a precise neutral position and are reciprocably displaceable therefrom to each of two opposite extreme positions.

The platform 10 traverses the undersurface of the tube sheet 14 by releasing either the fingers 11 or the fingers 12 from gripping engagement with their respective tubes 16 while the other fingers remain in gripping engagement, withdrawing the released fingers downwardly out of the tubes, moving the withdrawn fingers transversely of both the tube sheet 14 and the fingers in gripping engagement therewith into substantial alignment with respective new tubes 16, and reinserting and expanding the moved fingers within the respective new tubes 16. In FIG. 1, platform 10 is depicted during execution of a step in which fingers 11 are inserted in tubes 16 and fingers 12 are withdrawn for stepping.

Figure 2:
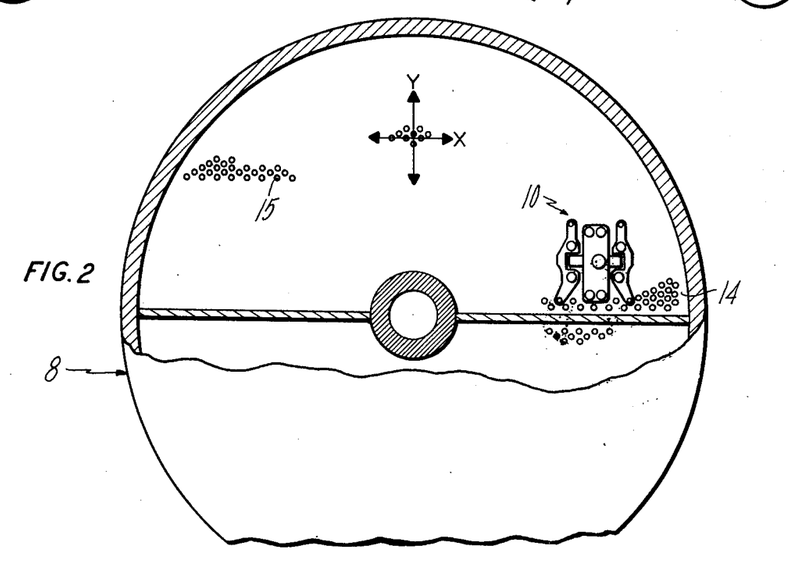
FIG. 2 is a diagrammatical bottom view of the surface traversing apparatus operatively positioned on the under-surface of a tube sheet in a nuclear steam generator.
Figure 3:
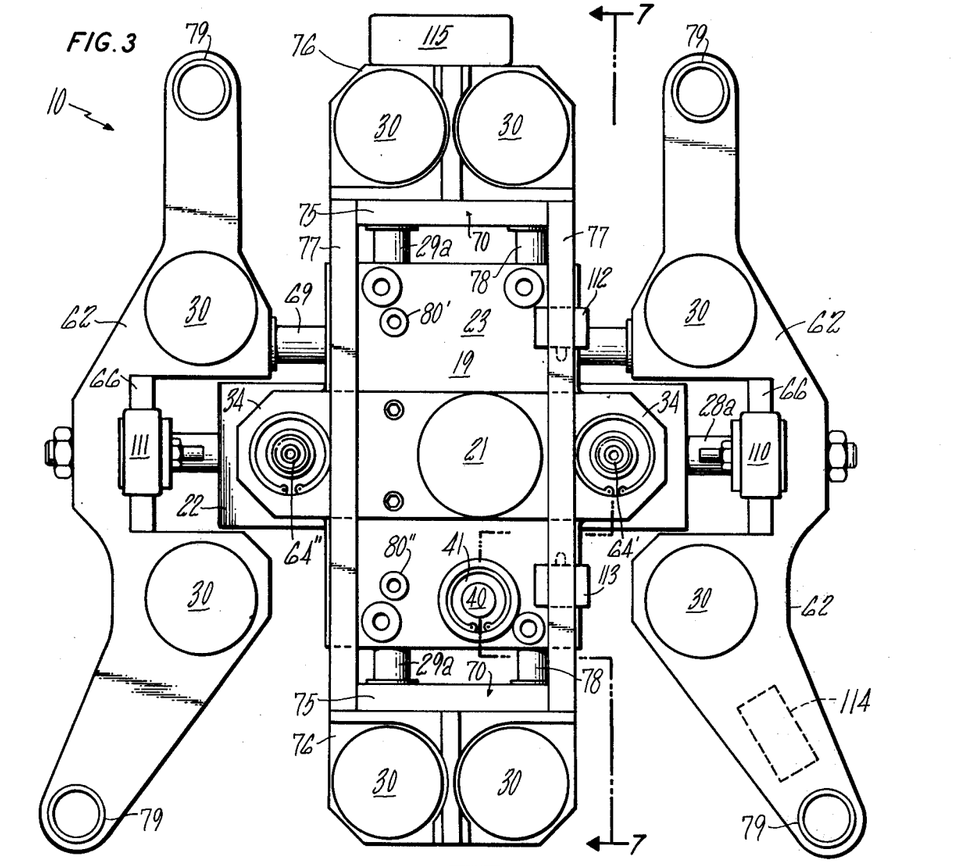
FIG. 3 is a bottom view of the surface traversing apparatus with the air and probe hoses removed for clarity.
Figure 4:
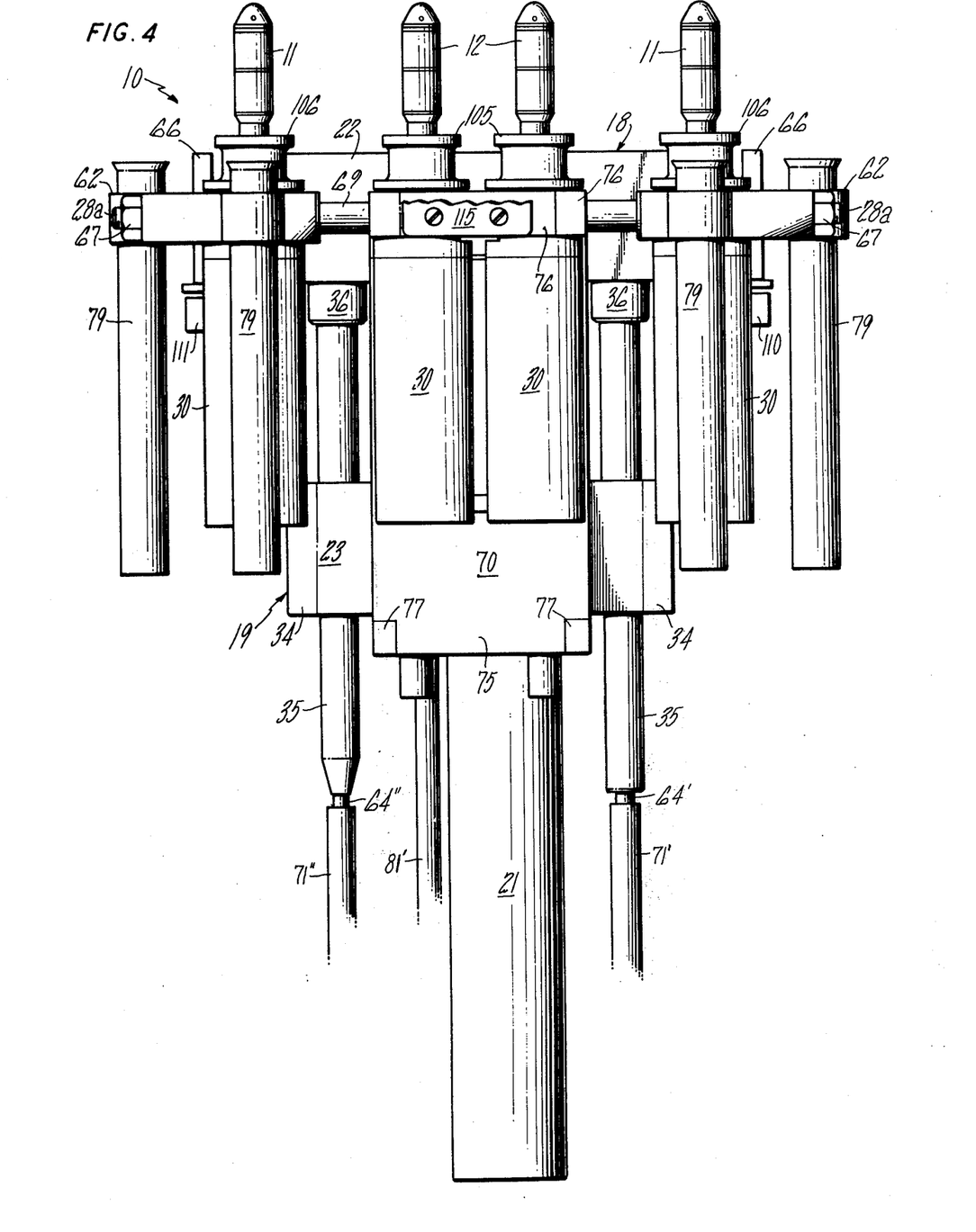
FIG. 4 is a front elevation view of the surface traversing apparatus.
Figure 5:
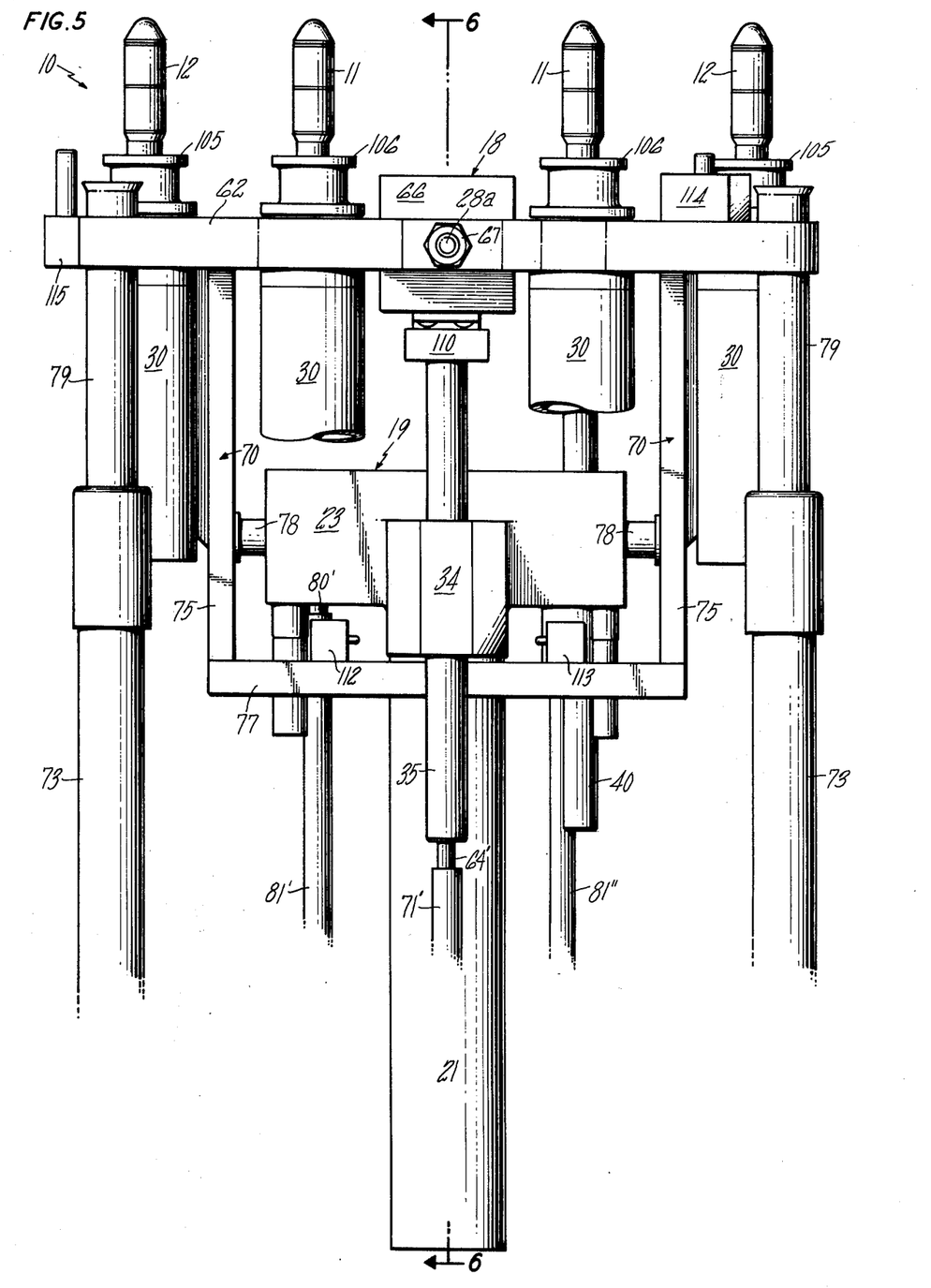
FIG. 5 is a right side elevation view of the surface traversing apparatus.

Referring now in greater detail to the platform 10 and to the inventive aspects thereof, the tubes 16 in the tube sheet 14 across which platform 10 moves are arranged such that the openings 15 are patterned in a uniform array of plural parallel rows extending orthogonally of plural parallel lines and represented by arrows $x$ and $y$ respectively in FIG. 2. Further, the openings 15 in any particular row or line are offset in the direction of a line or row respectively relative to the holes in the respective rows or lines on the immediately adjacent opposite sides thereof such as to have what is termed a "triangular pitch," with the center-to-center spacing between each adjacent pair of openings 15 being identical.

Figure 6:
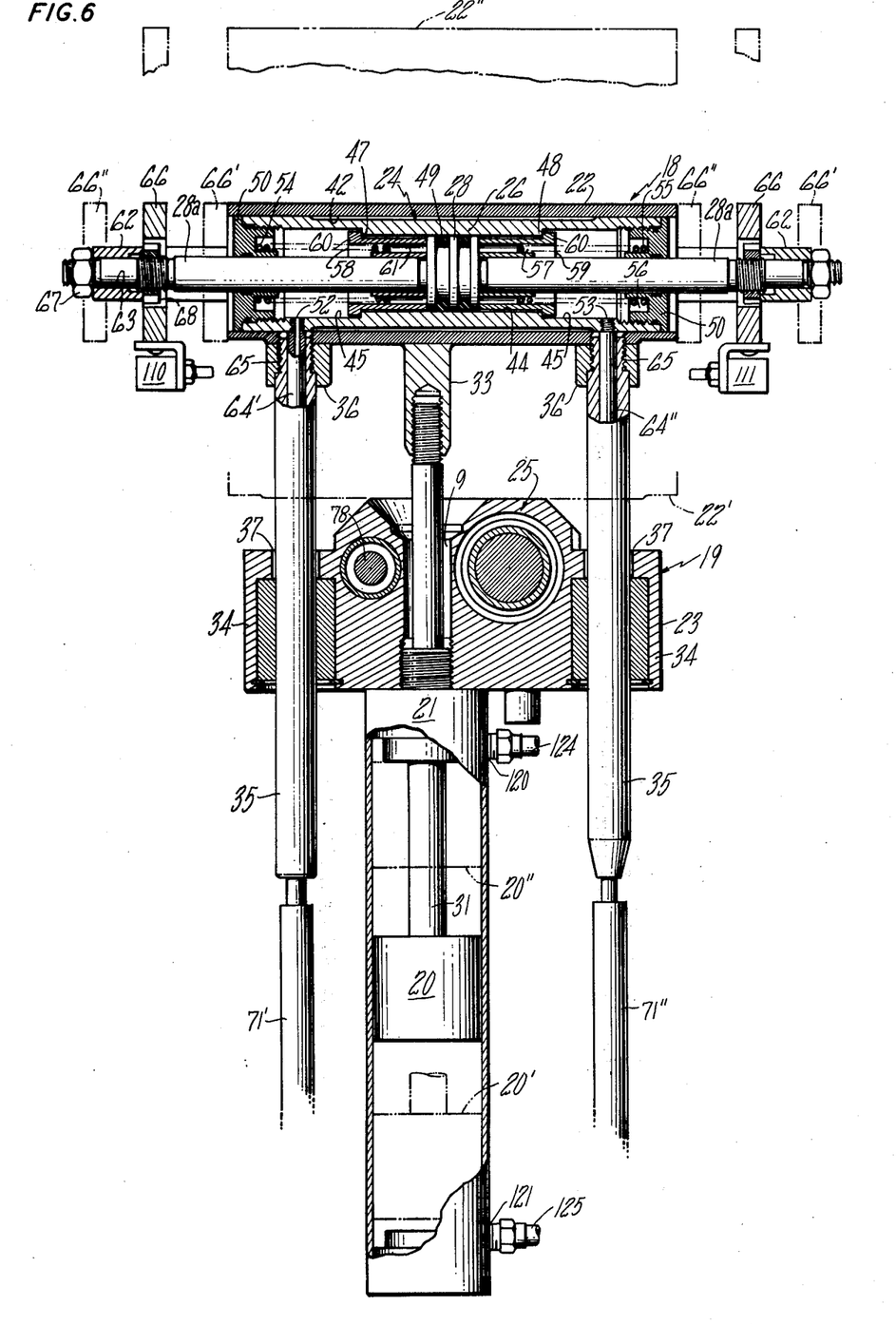
FIG. 6 is a sectional view of the surface traversing apparatus, with portions broken away, taken substantially along line 6—6 of FIG. 5.
Figure 7:
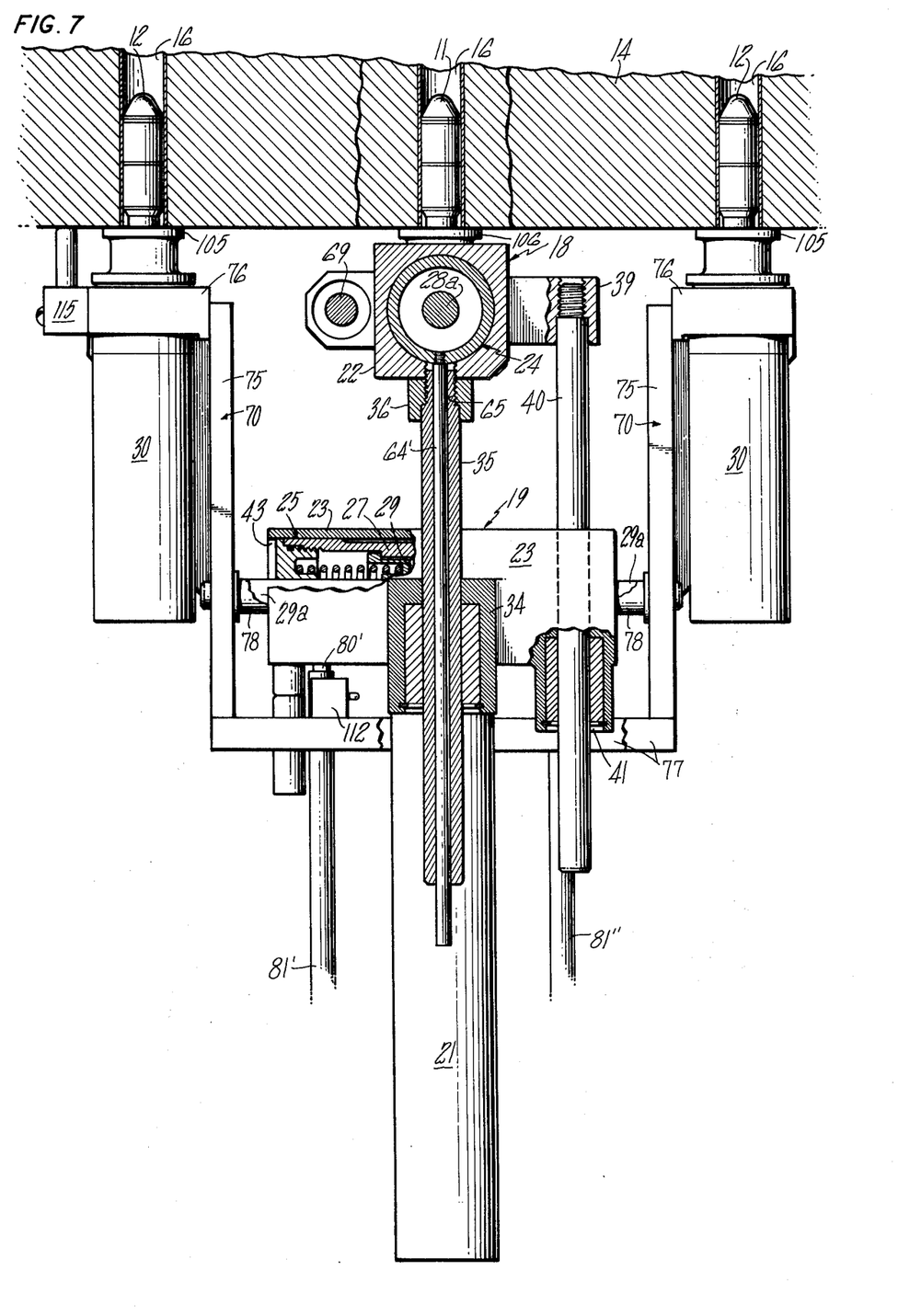
FIG. 7 is a sectional view of the surface traversing apparatus, with portions broken away, taken substantially along line 7—7 in FIG. 3 and showing the fingers inserted in tubes in the steam generator tube sheet.

As illustrated in FIGS. 4-7, and particularly FIG. 6, the base housing 22 of slide assembly 18 is positioned above the base housing 23 of slide assembly 19, the two bases 22 and 23 comprising a vertically separable compound base for platform 10. The actuating cylinder 21 is affixed at its upper end to the bottom of base housing 23 by threaded engagement therewith and depends therefrom. The piston 20, operative within cylinder 21, includes a piston rod 31 extending upwardly therefrom through a vertical bore 9 in base 23 and is affixed at its upper end to the bottom of base 22 by threaded engagement with a rigid mounting boss 33 depending from the base 22. A source of pressurized fluid, such as pressurized air source 74 located outside of steam generator 8, is selectively connected to upper and lower ports 120 and 121 respectively in the cylinder 21 through respectively three-way valves 122 and 123 and respective air hoses 124 and 125, the air hoses extending between the valves and the cylinder ports. Each of the three-way valves 122 and 123 is selectively operative to alternatively connect the respective hose 124 and 125 to the fluid source or to connect the respective hose to an exhaust or vent port in the valve. The cylinder 21 in the illustrated embodiment is structured for a five-inch stroke length of piston 20, however, the length of piston rod 31 is such that the bases 22 and 23 contact one another, forming a hard stop, when the piston 20 is about ¼ inch above its normal lower terminus. The diameter of bore 9 in base 23 is sufficient to clear the mounting projection 33 as the bases 22 and 23 move vertically into contact.

In FIG. 6, base 22 and piston 20 appear in solid lines at that positioning relative to base 23 and cylinder 21 respectively at which all of the fingers 11 and 12 are fully inserted into respective tubes 16. This corresponds with piston 20 being substantially centered in cylinder 21. When the fingers 11 connected to base 22 are to be withdrawn from the tube sheet 14, fluid is vented from cylinder 21 through the lower port 121 and fluid is admitted through the upper port 120 to allow the piston 20 and base 22 to move downwardly to the positions shown in phantom and numbered 20' and 22' respectively. Conversely, when fingers 12 connected to base 23 are to be withdrawn from tube sheet 14, fluid is admitted to the cylinder 21 through lower port 121 and is vented through the upper port 120 to allow the base 23 and cylinder 21 to move downwardly; however, this is depicted in FIG. 6 as relative upward movement of piston 20 and base 22 to the positions shown in phantom and numbered 20" and 22" respectively. The foregoing operations are reversed to insert fingers 11 or 12 which have been withdrawn. When all fingers 11, 12 have been fully inserted into gripping engagement with the tubes 16, the valves 122 and 123 isolate the cylinder 21 from air source 74.

Both bases 22 and 23 are of generally rectangular geometry in plan view with the longer dimension of each extending orthogonally of the other to accommodate the axial extents of the respective slide cylinders 24 and 25 therewithin, the axial extent of slide cylinder 24 extending parallel to the rows $x$ of holes 15 in tube sheet 14 in the illustrated embodiment. The lower base 23 additionally includes a pair of laterally extending support projections 34 on opposite sides thereof and the upper base 22 includes a laterally extending projection 39 on one side thereof. A pair of hollow rigid guide tubes 35 are fixed in fluid-sealed engagement at their upper ends with a respective pair of tubular bosses 36 on the bottom of base 22 near its opposite ends. The guide tubes are threaded into tapped bores 65 in the respective bosses 36. The guide tubes 35 extend downwardly through bearings in respective vertical guideways 37 in the lateral projections 34 of base 23 and are vertically reciprocable therewithin in close relationship therewith. Similarly, a rigid guide rod 40 is fixed at its upper end to the projection 39 on base 22 and extends downwardly through a bearing in another guideway 41 in the base 23, in close reciprocable relationship therewith. The guideways 37 and 41 cooperate with the guide tubes 35 and guide rod 40 respectively to laterally align and support base 23 relative to base 22.

Referring to the slide cylinder assemblies 24 and 25, both assemblies are essentially identical in internal design, the only exceptions being that the upper cylinder 26 is longer than the lower cylinder 27, the stroke length of piston 28 is longer than that of piston 29, and various components within cylinder 26 are correspondingly longer than their equivalents in cylinder 27. For this reason, only the upper cylinder assembly 24 illustrated in FIG. 6 will be depicted and described in detail. The cylinders 26 and 27 are secured in their respective bases 22 and 23 by several nylon-tipped self-locking set screws, not shown, which extend in threaded engagement through the respective bases into frictional engagement with the outer walls of the respective cylinders.

Cylinder assembly 24 is designed such that piston 28 is normally biased to a precise intermediate or centered neutral position within cylinder 26 and is axially displaceable from the neutral position to either of two extreme positions on opposite sides of the neutral position. The cylinder 26 is of one inner diameter along a mid-portion 44 having axial symmetry with the middle of the cylinder, and is of a greater diameter along each of the two axially outer portions 45, 45 immediately adjacent the axially opposite ends of mid-portion 44, thereby creating radial stop surfaces 47 and 48 respectively. The axial length of cylinder mid-portion 44 is preferably at least as long as the length of the piston 28 and its intended stroke length.

The piston 28 includes a pair of axially spaced sealing rings 49 seated thereon in fluid sealing engagement with the mid-portion 44 of the cylinder 26. A pair of piston rods $28_a$ are fixed to the piston 28, with a rod extending axially outwardly from each of the opposite ends of the piston. The piston rods $28_a$ extend through apertured cylinder end covers 50 which are threadedly secured to the opposite ends of the cylinder 24. The end covers 50 are in fluid sealed relationship with the cylinder 24 and provide a relatively slideable fluid seal about the piston rods $28_a$. A pair of tapped fluid ports 52, 53 extend radially through the cylinder 26 toward or near the opposite ends thereof respectively adjacent the axially inner sides of the two end covers 50 to provide fluid communication to each of the opposite ends of the piston 28, as in a double acting cylinder. The bosses 36 on base 22, and more specifically the bores 65 in the respective bosses, are in radial alignment with the respective tapped fluid ports 52, 53. The bores 65 extend through the base 22 for communication with ports 52, 53. Each one of a pair of hollow fluid tubes 64' and 64" is press fitted within a respective hollow guide tube 35 with its lower end extending below the guide tube 35 for connection to respective fluid hoses 71' and 71". The upper ends of the fluid tubes 64' and 64" extend beyond the upper ends of the respective guide tubes 35 and are threaded for fluid sealing threaded engagement with respective ports 52, 53 when the guide tubes 35 are threaded into bores 65 in bosses 36.

The piston 28 is biased toward a precise neutral position, shown in solid lines in FIG. 6, by a pair of cylindrical coil springs 54 and 55 acting axially in compression on the axially opposite ends of the piston 28. The axially outer ends of the springs 54 and 55 are seated in respective axially recessed annular grooves 56 in the respective cylinder end covers 50. The springs 54 and 55 act axially inwardly on opposite sides of the piston 28 to urge the piston to some position at which the opposed biasing forces balance, or stated another way, the net biasing force is zero. However, it is practically impossible to have two springs which would have constant relative spring rates over the life of their use, and as the spring rate relationship changed the position of the piston 28 at which the opposing spring forces would balance would also change. Therefore, in order to insure a constant neutral position of piston 28 within cylinder 26, the net biasing force applied to piston 28 by springs 54 and 55 is removed or cancelled at one, and substantially only one, precise axial positioning thereof. This is accomplished by stopping the inward axial travel of springs 54, 55 at precise positions through their engagement with the respective stop surfaces 47, 48.

The axially inner ends of springs 54 and 55 are seated in respective axially recessed annular grooves 57 in respective cylindrical adaptor members 58 and 59. The adaptor members 58 and 59 encircle the respective piston rods $28_a$ adjacent the opposite ends of the piston 28 and are slideable relative to the cylinder 26 and the piston rods $28_a$. The adaptor members 58 and 59, which are preferably identical in size and shape, each include a forward or axially inner section having an outer diameter slightly less than the inner diameter of cylinder mid-section 44, and a rearward or axially outer section which extends radially outwardly of the forward section to form a flange or stop dog 60 which radially overlaps the respective stop surface 47 or 48. The forward end of each adaptor 58, 59 is positioned to contact a respective end of the piston 28 and the sum of the axial length of piston 28 and the lengths of the forward sections of both adaptors 58, 59 (from stop dogs 60) is selected to equal the axial spacing between stop surfaces 47, 48 to within 0.005 inch. Stated another way, when a balanced fluid pressure exists on opposite sides of piston 28, such as either no pressure or equal overpressures at both of ports 52, 53, the piston 28 will be spring biased to a neutral position which remains accurate or constant to within ±0.0025 inch. At the neutral position, the net spring biasing force is essentially zero.

The adaptors 58, 59 each include four vent holes 61 extending axially from the annular groove 57 to the inner or forward end of the adaptor to provide direct fluid communication between the fluid ports 52, 53 and the respective ends of piston 28 for actuation of the piston when an increased fluid pressure appears at a fluid port.

Two finger mounting plates 62 are fixed to the axially outer ends of the respective opposite piston rods $28_a$ of cylinder assembly 24. Each plate 62 is in the general shape of a horizontal arm extending transversely of the axis of cylinder 26. A hard contact plate 66 fixed to the inner side of each mounting plate 62 is positioned to contact and stop against the respective adjacent end of the base 22 when the piston 28 is reciprocated a certain distance toward the remote end of the cylinder 26 from the neutral position to establish the limit of travel of piston 28 in that direction. The outer end of each piston rod $28_a$ extends through a mounting bore 63 in the respective mounting plate 62 and contact plate 66, and nuts 67 and 68 are threaded to the rod respectively outside plate 62 and inside contact plate 66 in engagement therewith to position the plate axially of the rod. The bore 63 through which each piston rod $28_a$ extends is counterbored to receive nut 68 fully therewithin, thereby insuring that the larger surface area of contact plate 66 provides the stop contact with the end of base 22. A rigid spacer and guide rod 69 extends parallel to piston rods $28_a$ and is fixed at its opposite ends to the two mounting plates 62 by suitable fasteners for maintaining alignment between the mounting plates and the base 22. The guide rod 69 is reciprocably supported by a bearing housed in base 22.

In the illustrated embodiment, the mounting plates 62 are positioned on their respective piston rods $28_a$ such that the stroke length of piston 28 from its neutral position in cylinder 26 to either of the opposite extremes or outer limits is equal, that length being the center-to-center distance between two immediately adjacent lines y of openings 15. These stroke lengths are less than that required for the piston 28 to contact the cylinder end covers 50 so as to preserve the integrity of end covers 50, though it will be appreciated that if the fluid pressures are not great, the length of cylinder 26 might be selected such that the end covers 50 provide the stroke limits.

The lower cylinder assembly 25, which is essentially the same in internal design as upper cylinder assembly 24, includes a pair of piston rods $29_a$ respectively extending beyond the ends of base 23 from the opposite ends of piston 29. Each piston rod $29_a$ is rigidly fixed to a respective one of two brackets assemblies 70 which in turn each mount two fingers 12. Each bracket assembly 70 includes a vertically extending, rectangular bracket plate 75 fixed to the axially outer end of a respective piston rod $29_a$ by conventional fastening means, such as a nut or screw, and a horizontal finger mounting plate 76 secured to the bracket plate near its upper end, as by welding. The bracket plates 75 each extend transversely of their respective piston rods $29_a$ to present a large surface area for contacting the adjacent end of base 23 thereby to establish the limits of travel for piston 29 in the same manner as do the contact plates 66 for piston 28. The positioning of bracket plates 75 on their respective piston rods $29_a$ is such that the stroke length of piston 29 in cylinder 27 is the same in both directions from the neutral position and is equal to the center-to-center spacing between two immediately adjacent rows x of openings 15.

Two rigid reinforcing straps 77 extend between and are fastened to the respective lower corners of the opposed bracket plates 75 to laterally support the bracket plates. Additionally, a rigid spaced and guide rod 78, similar to guide rod 69, extends parallel to piston rods $29_a$ and is fixed at its opposite ends to the two bracket plates 75 by suitable fasteners for maintaining alignment between the bracket plates and the base 23. The guide rod 78 is reciprocably supported by a bearing housed in base 23.

The finger mounting plates 76 are the same thickness as plates 62 and extend outwardly from the bracket plates 75 at the same vertical position or elevation as plates 62 when the piston 20 is axially centered in vertical cylinder 21. Each mounting plate 76 is relatively compact for mounting two closely spaced fingers 12 and associated actuating cylinders 30, whereas each mounting plate 62 is elongated for a somewhat wider spacing of its fingers 11 and for mounting a pair of spaced probe tubes 79 at its opposite extremities. The probe tubes 79 may receive eddy current probes or the like from outside of steam generator 8 through conduits 73. In fact, one end of each mounting plate 62 has a dog leg bend outwardly from the bases 22, 23 such that the probe tube 79 near the end of the dog leg has access to various of the openings 15 located in remote corner regions of the tube sheet 14.

A pair of rigid fluid tubes 80' and 80", similar to but shorter than fluid tubes 64' and 64", extend upwardly through the base 23 radially of bore 43 and into threaded engagement with a respective pair of ports (not shown) near the opposite ends of the cylinder 27. Fluid hoses 81' and 81" are connected to the fluid tubes 80' and 80" respectively for conveying fluid to or from the respective ends of cylinder 27 to position the piston 29.

The fluid hoses 71' and 71" for cylinder 26 are connected to air source 74 through three-way valves 82' and 82" respectively. Similarly, the fluid hoses 81' and 81" for cylinder 27 are also connected to the air source 74 through three-way valves 83' and 83" respectively. Each of the three-way valves 82', 82", 83' and 83" is selectively operative to alternatively connect the respective fluid hose 71', 71", 81' or 81" to the fluid source or to connect the respective fluid hose to an exhaust or vent port in the valve.

When hose 71' is connected to the fluid source and the hose 71" is vented, the piston 28 is actuated to its stop-limited extreme position in cylinder 26 in which the contact plates 66 assume the position shown in phantom as 66' in FIG. 6; when hose 71" is connected to the fluid source and the hose 71' is vented, the piston 28 is actuated to the opposite stop-limited extreme position in which contact plates 66 assume the position shown in phantom 66"; and when both hoses 71' and 71" are disconnected from the fluid source and vented, the piston 28 and the contact plates 66 return to their neutral positions shown in solid lines in FIG. 6. Piston 29 operates in cylinder 27 in the same manner as piston 28 in cylinder 26. Accordingly, fingers 11 and fingers 12 are moved respectively en bloc transversely or laterally of the platform bases 22 and 23.

Referring now to fingers 11, 12 and their respective actuating cylinders 30, two fingers 11 are mounted on each mounting plate 62 and two fingers 12 are mounted on each mounting plate 76. The lateral spacing between each finger 11 or 12 on a mounting plate 62 or 76, and the lateral spacing between a pair of fingers 11 or 12 on one mounting plate and a respective pair of fingers 11 or 12 on the other respective mounting plate are held to a miniumum to insure passage of the carriage 10 through a manway 72 in steam generator 8. The minimum lateral spacing between fingers 11, 12 is generally dictated by the size and geometry of bases 22, 23, which is also kept to a minimum. The positioning of each finger 11 or 12 on its respective plate 62 or 76 is established such that each finger 11 or 12 has a counterpart on the diametrically substantially opposite side of cylinder 21 to provide support for the platform 10 in vertical planes which pass through or near the center of cylinder 21 and thus also through or near the center of gravity of the platform 10 for stability. The four probe tubes 79 are all located at the outer bounds of lateral movement of the fingers 11, 12, though they might be positioned outwardly further if space limitations permit. All of the fingers 11, 12 are of identical structure and are mounted to their respective mounting plates 62, 76 in an identical manner which permits some lateral deflection of the finger relative to its mounting plate to permit or facilitate the insertion of the respective finger into an opening 15 with which it might be slightly misaligned as a result of eccentricities in the weld bead 17, accumulated tolerances in the spacing of tubes 16 and/or accumulated tolerances in the mechanisms of platform 10. Accordingly, only the structure and mounting arrangement for one finger 12 will be described in detail.

Figure 8A:
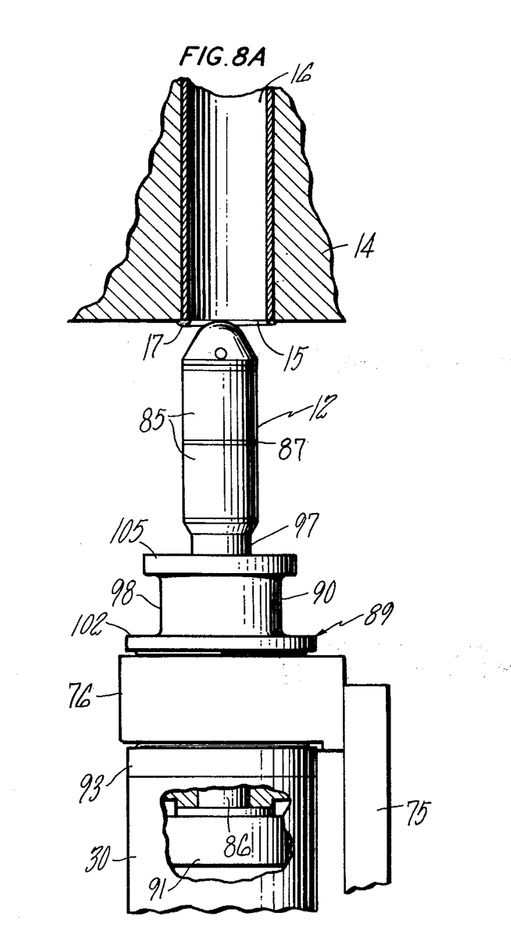
FIGS. 8A, 8B and 8C are enlarged elevation views, partly broken away and partly in section, showing a finger in a normal reference position on the surface traversing apparatus and in limited misalignment with the opening of a tube prior to its insertion thereinto, showing the finger entering the tube and being deflected from its reference position, and showing the finger fully inserted in the tube in retained engagement therewith and laterally deflected from its reference position respectively.
Figure 8B:
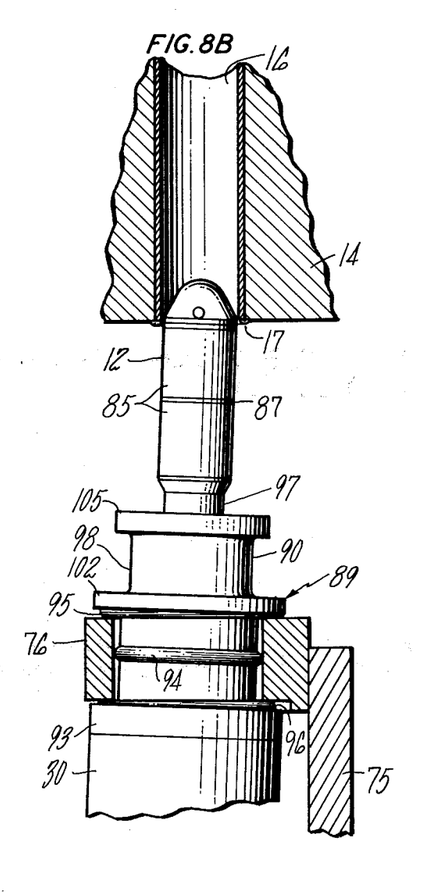
Figure 8C:
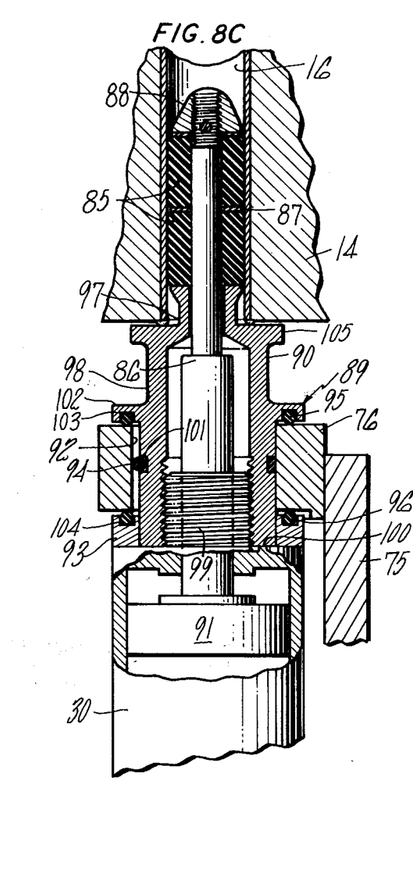

The finger 12, as illustrated in FIGS. 8A-8C, comprises a pair of cylindrical elastomer expanders 85 concentrically mounted in radially close fitting engagement about a reduced diameter section of a piston rod 86 which extends upwardly from the actuating cylinder 30. The pair of expanders 85 are axially separated by a washer 87 which encircles piston rod 86.

A bullet-nose end cap 88 is threaded and locked to the axially outer or upper end of the piston rod 86 with its base in downwardly facing retaining engagement with the upper end of the uppermost of the pair of expanders 85. A rigid, generally cylindrical mounting adaptor 90, to be more fully described hereinafter, is fixed to the cylinder 30 and axially engages the lower end of the lowermost of the pair of expanders 85 in upwardly facing retaining relationship therewith. The actuating cylinder 30 is of a conventional double acting type and houses a piston 91 from which piston rod 86 extends. The spacing between end cap 88 and mounting adaptor 90 axially of the expanders 85 is such that the expanders 85 are in constant axial engagement with end cap 88 and adaptor 90, with the piston 91 being normally drawn to, or nearly to, its uppermost limit in the cylinder 30.

Introduction of pressurized fluid to the upper fluid port (not shown) in cylinder 30 is operative to drive piston 91 relatively downwardly, thereby axially compressing the expanders 85 and effecting a corresponding radial expansion thereof. The normal or relaxed diameter of the expanders 85 of finger 12 is such as to provide sufficient radial clearance between the finger 12 and the inner wall of a tube 16 to facilitate their relative insertion and withdrawal, while requiring relatively little downward displacement of piston 91 to expand the expanders 85 into tight frictional engagement with the inner wall of a tube 16 for supporting a portion of the weight of platform 10. An air pressure of 60-100 psi is suitable for obtaining the requisite displacement of piston 91. Air is vented from above piston 91 and pressurized air may be introduced to the lower fluid port (not shown) in cylinder 30 to return the expanders 85 to the relaxed or contracted state. The four cylinders 30 associated with fingers 11 are connected for actuating en bloc, and the four cylinders 30 associated with fingers 12 are connected for actuation en bloc independently of the finger 11 cylinders.

A finger 12 and its actuating cylinder 30 are mounted on the platform 10 by a mounting assembly 89 which is resiliently supported by the mounting plate 76. The mounting assembly 89 includes the mounting adaptor 90 which extends through a vertical mounting bore 92 in plate 76; a rigid annular spacer 93 which encircles the adaptor 90 below plate 76; and three resilient annular mounting members such as resilient rubber O-rings 94, 95 and 96 or the like, interposed between the plate 76 and either the adaptor 90 or the spacer 93.

The mounting adaptor 90 is of generally cylindrical geometry and has upper and lower sections 97 and 98 respectively. The adaptor lower section 98 is internally threaded near its lower end and concentrically encircles and threadedly engages an externally threaded end extension 99 extending coaxially upwardly from the actuating cylinder 30. The cylinder end extension 99 is of smaller outside diameter than the main body of cylinder 30, and the lower end of adaptor 90 axially abuts the upwardly facing annular shoulder 100 formed at the junction of extension 99 with the cylinder 30 proper. The adaptor lower section 98 extends upwardly from cylinder 30 through bore 92 in plate 76 with a diametral clearance therebetween which permits movement of the adaptor 90 both laterally and angularly or pivotally relative to the plate 76. In the illustrated embodiment, this diametral clearance is about 0.050 inch, and the thickness of plate 76 around bore 92 is such that the adaptor 90 and attached finger 12 and cylinder 30 are capable of universally pivoting or angularly deflecting 3° or 4° relative to the axis of bore 92, an angle of about 2° being illustrated in FIG. 8B.

The resilient O-ring 94 is seated in an annular radial groove 101 in the outer surface of the adaptor lower section 98 for radially oppositely engaging the adaptor 90 and the plate 76 within bore 92 to resiliently center the adaptor in the bore. The O-ring 94 is positioned midway between the top and bottom of bore 92 to pivot the adaptor 90 and finger 12 thereat if a moment of force is applied to finger 12 near its upper end.

A flange 102 extends radially outwardly from the adaptor lower section 98 over the plate 76 and includes an annular axial groove 103 in the undersurface thereof overlying the plate 76. The spacer 93 concentrically closely encircles the adaptor lower portion 98 in axial abutment with the annular shoulder 100 on cylinder 30 and includes an annular axial groove 104 in the upper surface thereof which radially underlies the plate 76. The axial spacing between the spacer 93 and the adaptor flange 102 is greater than the vertical thickness of plate 76 to permit the pivotal deflection of the finger 12 earlier described. The resilient O-rings 95 and 96 are seated in grooves 103 and 104 respectively in opposing axial engagement with the upper and lower surfaces respectively of plate 76 and cooperate with the resilient O-ring 94 normally maintain the adaptor 90 centered coaxially within bore 92, as illustrated in FIG. 8A. By having flange 102 as an integral part of adaptor 90, the spacing between flange 102 and spacer 93 is easily established and repeatably maintained by threading the adaptor 90 into abutting engagement with adaptor shoulder 100.

The adaptor upper section 97 is of smaller internal and external diameters than the adaptor lower section 98, its internal diameter being sized to provide lateral support to the reduced diameter section of piston rod 86 in sliding relationship therewith and its external diameter being substantially the same as that of the expanders 85 in their relaxed state for insertion into a tube 16. A rigid stop flange 105 extends radially outwardly from the adaptor 90 at the base of the adaptor upper section 97 for engagement with the underside of tube sheet 14 to limit the extent of insertion of finger 12 into a tube 16. The extend of insertion of fingers 11 in respective tubes 16 is similarly limited by corresponding stop flanges 106 respectively associated therewith, the full insertion of both the fingers 11 and 12 corresponding with a centered positioning of piston 20 in cylinder 21. It will be appreciated that the length of fingers 11, 12 above the respective stop flanges 106, 105 is less than the 2¼ inch maximum stroke length of piston 20 downwardly from its centered position in cylinder 21. It will be further appreciated that downward slippage of one or both groups of fingers 11 and 12 relative to tubes 16 is compensated for by fully inserting each set of fingers to their respective stop flanges during each step of those fingers. In this way, any such slippage does not accumulate from step to step, but rather each successive stepping action of a set of fingers 12 or 13 is effective to recover any slippage of that set of fingers occurring since its previous step.

Briefly, FIG. 8A shows a finger 12 normally centered on its plate 76 prior to insertion into a tube 16 with which it is substantially, but not exactly, aligned. The FIG. 8B shows finger 12 as it enters tube 16 and is deflected or pivoted rightwardly by engagement with the left side of the weld bead 17 and the tube. The FIG. 8C shows the finger 12 fully inserted in and expanded into retained engagement with the tube 16, the finger 12 and adaptor 90 having been laterally displaced rightwardly of their normally coaxial alignment with bore 92 and into contact with the plate 76 at the right side of bore 92.

Referring to the operation of platform 10, air to and from ech of the various actuating cylinders is controlled by solenoid actuated valves (only valves 82', 82'', 83' and 83'' being shown herein) which are computer controlled. Electrical signals indicating the positions of the various movable elements of platform 10 are provided by microswitches 110–115 respectively, the signals being connected (by conductors, not shown) as inputs to a control computer. Microswitches 110 and 111 are respectively fixed to the two mounting plates 62 and are positioned such that they are actuated by contact with bosses 36 at the two extreme positions of slide piston 28 respectively. Similarly, microswitches 112 and 113 are respectively fixed to one of the reinforcing straps 77 which moves with bracket plates 75 and are positioned such that they are actuated by contact with a support projection 34 at the two extreme positions of slide piston 29 respectively. The microswitches 114 and 115 are fixed to a mounting plate 62 and 76 respectively and are positioned such that they are actuated when the fingers 11 and fingers 12 respectively are nearly fully inserted into respective tubes 16. Additional microswitches, not shown, may be positioned on platform 10 for actuation when the bases 22 and 23 are either in contact with one another or are at their miximum spacing relative to one another.

Through selective computer control of the respective solenoid actuated valves associated with the respective air cylinders 21, 26, 27 and 30, the fingers 11 and 12 are moved en bloc relatively vertically and laterally for traversing the tube sheet 14. The lateral or transverse relative movement between fingers 11 and fingers 12 occurs through lateral or transverse movement of fingers 11 or fingers 12, or both, relative to the combined bases 22 and 23; whereas the relative vertical or longitudinal movement between fingers 11 and fingers 12 occurs through movement of one group of fingers 11 or 12 and their respective base 22 or 23 vertically relative to the respectively opposite base 23 or 22.

To step platform 10 across the tube sheet 14, the expanders 85 either of fingers 11 or fingers 12 are relaxed and the respective base 22 and 23 is moved downwardly relative to the other base and the tube sheet to clear the respective fingers from the tube sheet, the fingers 11 and 12 so cleared from the tube sheet are then moved en bloc transversely of the other fingers 12 or 11 and the tube sheet into substantial alignment with respective "new" tubes 16 by actuation of a selected one or the other, or both, of the slide cylinder assemblies 24 and 25, the respective base 22 or 23 of the fingers 11 or 12 so moved is then moved upwardly relative to the other base and the tube sheet to insert the fingers in the respective "new" tubes, and the expanders 85 of the newly inserted fingers are expanded into gripping engagement with the "new" tubes.

If either one of the slide cylinder assemblies 24 or 25 is at one of its two outer extreme positions at the initiation of a step, movement of the particular slide assembly to its opposite extreme is effective to move that set of fingers 11 or 12 which is clear of tube sheet 14 from alignment with openings 15 in one line or row of tubes 16 to "new" opengings two lines or two rows away respectively. On the other hand, if both slide cylinder assemblies 24 and 25 are in their neutral or centered positions at the initiation of a step, both slide cylinder assemblies will be actuated to appropriate extreme positions such that the set of finers 11 or 12 which is clear of tube sheet 14 is moved from alignment with openings 15 in one line and row to "new" openings one line and one row away. This latter move may be termed a "diagonal" move as it includes both an x component and a y component, and makes it possible for the platform 10 to position the probe tubes 79 in alignment with virtually every tube 16 on tube sheet 14.

As will be apparent to persons skilled in the art, various modifications, adaptations and variations of the foregoing specific disclosure can be made without departing from the teachings of the present invention.

The embodiments of the invention in which an exclusive property or privilege is claimed are defined as follows:

1. In a surface traversing apparatus adapted to be supported near a member for traversing the surface of the member by stepwise motion, the surface traversing apparatus including base means, first and second anchor means each movably conected to the base means for stepwise lateral relative motion in different respective directions, the first and second anchor means being selectively engageable with the member for resisting lateral motion relative thereto, first and second actuating means operatively connected to the first and second anchor means respectively and to the base means for moving the respective first and second anchor means laterally relative to one another in discrete steps, means to alternately engage the first and second anchor means with the member while the other of the anchor means is disengaged from the member so as to transport the first or second anchor means laterally relative to the other of the anchor means by the first or second actuating means respectively to move the first and second anchor means to new relative positions, the improvement wherein said first and second actuating means respectively each comprises:

a fluid cylinder fixed to said base means, said cylinder having a pair of fluid ports positioned toward respectively opposite ends thereof;

piston means in said cylinder, said piston means having piston rod means affixed thereto and connected to a respective one of said first and second anchor means, said piston means being selectively reciprocably movable axially in either direction from a substantially constant neutral position in said cylinder;

first and second axially compressible mechanical bias means within said cylinder on axially opposite sides of the piston means, said first and second bias means each including a respective axially inner end for compressive engagement with a respective opposite side of the piston means whenever the piston means is axially displaced from said neutral position in the direction of the respective bias means for applying an axially inward biasing force to the piston; and first and second limit means in said cylinder for limiting the axially inward travel of the axially inner end of said first and second bias means respectively such that a net axial biasing force is always applied to said piston means by one or the other of said first and second bias means except at said neutral position of said piston, whereby fluid pressure selectively applied alternatively through one or the other of the cylinder fluid ports to the respective side of the piston means is operative to overcome the respective said first or second bias means and displace said piston means oppositely from said neutral positioning by a step increment and release of fluid pressure from both sides of said piston means allows the respective first or second bias means to return said piston means to said neutral position.

2. The surface traversing apparatus of claim 1 wherein said first and second limit means comprise respective first and second dog means connected to move with the axially inner ends of the respective first and second bias means, and respective first and second stop surface means fixed in said cylinder for axially directed engagement with said first and second dog means respectively thereby to limit the axially inward travel of the axially inner ends of said first and second bias means respectively.

3. The surface traversing apparatus of claim 2 wherein said first and second mechanical bias means each comprise spring means encircling said piston rod means and said first and second dog means each comprise axially movable radially flanged spring seats, each said spring seat being positioned axially intermediate said respective spring means and said piston means and said spring seat flange being positioned to engage the respective said stop surface means to limit inward travel of the spring seat and respective spring means.

4. The surface traversing apparatus of claim 3 wherein each said spring seat includes fluid passage means extending therethrough for providing substantially direct fluid communication between the cylinder port and the piston respectively located on opposite sides of the respective spring seat.

5. The surface traversing apparatus of claim 3 wherein said piston rod means comprise a pair of piston rods, one piston rod extending axially outwardly from each of the axially opposite ends of said piston means, and each said spring seat is annular and coaxially encircles a respective piston rod of said pair of piston rods in axially movable relationship therewith.

6. The surface traversing apparatus of claim 2 wherein the surface of said member includes a plurality of parallel lines of holes and plurality of parallel rows of holes extending normally thereinto, said holes in a line being uniformly spaced and said holes in a row being uniformly spaced, said lines and said rows of holes extending angularly to one another, said first and second anchor means being respectively sized for insertion in respective said tubes, and wherein said first and second anchor means are movable laterally of said base means parallel to a row and to a line of said holes respectively, said step increments for said first and for said second anchor means corresponding with an integer multiple of the center-to-center spacing between adjacent said rows of holes and adjacent said lines of holes respectively, and said first and said second anchor means respectively being selectively reciprocable transversely of the axis of their respective said piston means for selective insertion into and retraction from said holes.

7. The surface traversing apparatus of claim 6 wherein said first and second anchor means each comprise selectively radially expansible finger means, said finger means being radially expansible into gripping engagement with said member when inserted in said holes thereby to support said platform proximate said member.

8. The surface traversing apparatus of claim 2 wherein said cylinder includes two axially spaced radial steps, said two steps respectively comprising said first and second stop surface means.

9. The surface traversing apparatus of claim 2 wherein said piston rod means comprise a pair of piston rods, one piston rod extending axially outwardly from each of the axially opposite ends of said piston means, and first and second stop members located externally of said cylinder are each positioned to respectively coact between said base means and a respective one of said piston rods to limit the step displacement distance of said piston means from said precise neutral positioning.

10. The surface traversing apparatus of claim 2 wherein said substantially constant neutral axial positioning of said piston is precise to within substantially 0.005 inch.

11. The surface traversing apparatus of claim 2 including fluid flow control means operatively connected to said pair of cylinder ports in said cylinder for selectively applying a net fluid pressure alternatively through one or the other of the cylinder fluid ports to the respective side of the piston means to overcome the respective said first or second bias means and displace said piston means oppositely from said neutral positioning by a step increment and for selectively releasing the fluid pressure from both sides of said piston means to return said piston means to said neutral position.

12. In a surface traversing apparatus adapted to be supported near a member for stepwise traversal of the surface of the member, said surface traversing apparatus including base means, first and second anchor means connected to said base means, said first anchor means being movable transversely of said base means and said second anchor means, said first and second anchor means selectively engageable with said member for resisting lateral motion relative thereto, actuating means operatively connected to said first anchor means and said base means for moving said first anchor means stepwise transversely of said base means and said second anchor means, means to alternately engage said first or second anchor means with said member while the other of said anchor means it disengaged from said member so as to transport said first anchor means by said actuating means transversely relative to said second anchor means to move said first and second anchor means to new relative positions, the improvement wherein said actuating means comprises a motor housing fixed to the base means, a drive member in said motor housing and operatively connected to said first anchor means, said drive member being reciprocable relative to said drive housing from an intermediate position to either of two opposite extreme positions by a driving force applied thereto, first and second bias means operative to act longitudinally oppositely on said drive member, first and second bias limiting means associated with said respective first and second bias means for cancelling said first and second bias means respectively when said drive member moves oppositely beyond said intermediate position thereof thereby to establish a specific neutral position substantially at said intermediate positions; and control means for selectively applying a driving force to said drive member to selectively alternatively overcome said first or second bias means respectively to move said drive member to the respective one of said extreme positions, said drive member returning to said neutral intermediate position when said driving force is removed.

* * * * *